(12) United States Patent
Eilers

(10) Patent No.: US 7,481,214 B2
(45) Date of Patent: Jan. 27, 2009

(54) SYSTEM AND METHOD FOR ENRICHING AIRCRAFT CABIN AIR WITH OXYGEN FROM A NITROGEN GENERATION SYSTEM

(75) Inventor: Kyle Eilers, Everett, WA (US)

(73) Assignee: The Boeing Company, Chicago, IL (US)

( * ) Notice: Subject to any disclaimer, the term of this patent is extended or adjusted under 35 U.S.C. 154(b) by 506 days.

(21) Appl. No.: 11/229,870

(22) Filed: Sep. 19, 2005

(65) Prior Publication Data

US 2007/0062371 A1    Mar. 22, 2007

(51) Int. Cl.
*A61M 11/00* (2006.01)
(52) U.S. Cl. ................. 128/200.24; 244/118.5
(58) Field of Classification Search ............ 128/204.29, 128/204.24, 204.18, 205.11, 200.24; 95/45, 95/54; 415/145; 244/118.5; 62/401
See application file for complete search history.

(56) References Cited

U.S. PATENT DOCUMENTS

| | | | |
|---|---|---|---|
| 4,546,939 A * | 10/1985 | Cronin | 244/118.5 |
| 4,681,602 A * | 7/1987 | Glenn et al. | 95/47 |
| 4,687,013 A | 8/1987 | Stevenson | |
| 5,911,388 A * | 6/1999 | Severson et al. | 244/118.5 |
| 5,967,461 A * | 10/1999 | Farrington | 244/118.5 |
| 6,926,490 B2 * | 8/2005 | McAuliffe et al. | 415/1 |
| 6,997,970 B2 * | 2/2006 | Crome | 95/8 |
| 7,255,104 B2 * | 8/2007 | Phillips | 128/204.22 |

* cited by examiner

*Primary Examiner*—Steven O Douglas
(74) *Attorney, Agent, or Firm*—Tung & Associates

(57) ABSTRACT

An aircraft cabin air treatment system configured in accordance with the invention utilizes oxygen enriched air, which is produced as a byproduct of an onboard inert gas generation system. The oxygen enriched air is released into an environment under ambient pressure conditions, i.e., at a relatively low absolute pressure compared to the cabin pressure. The low pressure oxygen enriched air is compressed with a cabin air compressor, and the outside air is routed back into the cabin. The cabin air compressor functions to generate oxygen enriched outside air and to maintain the desired pressurization of the cabin.

20 Claims, 2 Drawing Sheets

SYSTEM AND METHOD FOR ENRICHING AIRCRAFT CABIN AIR WITH OXYGEN FROM A NITROGEN GENERATION SYSTEM

TECHNICAL FIELD

The present invention relates generally to aircraft cabin comfort systems. More particularly, the present invention relates to a system that increases the partial pressure of oxygen in an aircraft passenger cabin.

BACKGROUND

Studies have shown that higher partial pressure of oxygen in commercial aircraft cabins provides improved comfort for passengers and crew. Simply put, for a given ambient air pressure, higher partial pressure of oxygen corresponds to a higher percentage of oxygen in the cabin air. Higher partial pressure of oxygen can also be achieved by increasing the pressurization of the cabin air.

Onboard oxygen generation systems ("OBOGS") are traditionally used to generate an oxygen supply for flight crew masks and possibly other onboard systems. Although an OBOGS can be utilized to introduce higher levels of oxygen into an aircraft cabin, such use is not economically viable in comparison to the use of pressurization to increase the partial pressure of oxygen in the cabin.

Onboard inert gas generation systems ("OBIGGS"), such as nitrogen generation systems ("NGS"), can be utilized to reduce the combustibility of aircraft fuel tanks. An NGS produces nitrogen, which is fed into the fuel tanks, and oxygen enriched air as a byproduct. In traditional applications, the oxygen enriched air is treated as waste and is released into the environment. In an attempt to increase the partial pressure of oxygen in an aircraft cabin, this oxygen enriched air may be reinserted into the cabin at cabin ambient pressure (which is a relatively high absolute pressure compared to ambient pressure at high altitudes). Such recycled use, however, is not practical because an NGS relies on a pressure drop to ambient to increase flow and efficiency. In addition, such recycled use is less efficient in comparison to the use of pressurization to increase the partial pressure of oxygen in the cabin.

Accordingly, it is desirable to have an efficient and economical system for increasing the partial pressure of oxygen in an aircraft cabin. In addition, it is desirable to have a system for processing aircraft cabin air, where the system recycles the byproduct of an OBIGGS. Furthermore, other desirable features and characteristics of the present invention will become apparent from the subsequent detailed description and the appended claims, taken in conjunction with the accompanying drawings and the foregoing technical field and background.

BRIEF SUMMARY

A system for processing cabin air of an aircraft is described herein. The system enables the use of oxygen enriched air, which would otherwise be treated as a waste gas, in a manner that does not significantly affect the sizing of the OBIGGS that generates the oxygen enriched air. Moreover, the system need not rely on an additional OBOGS to increase the partial pressure of oxygen in the cabin.

The above and other aspects of the invention may be carried out in one form by a method for processing cabin air of an aircraft. The method includes: treating used cabin air or engine bleed air with an OBIGGS to generate oxygen enriched air; routing the oxygen enriched air to a cabin air compressor; and compressing, with the cabin air compressor, the oxygen enriched air to generate outside air flow to the cabin. The above and other aspects of the invention may be carried out by another method that includes: obtaining used cabin air at a relatively high absolute pressure (or engine bleed air) at an input of an OBIGGS; generating, with the OBIGGS, oxygen enriched air; providing, at a relatively low absolute pressure, the oxygen enriched air to an intake of a cabin air compressor; and generating, with the cabin air compressor, outside air flow at a relatively high absolute pressure, where the outside air includes the oxygen enriched air.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
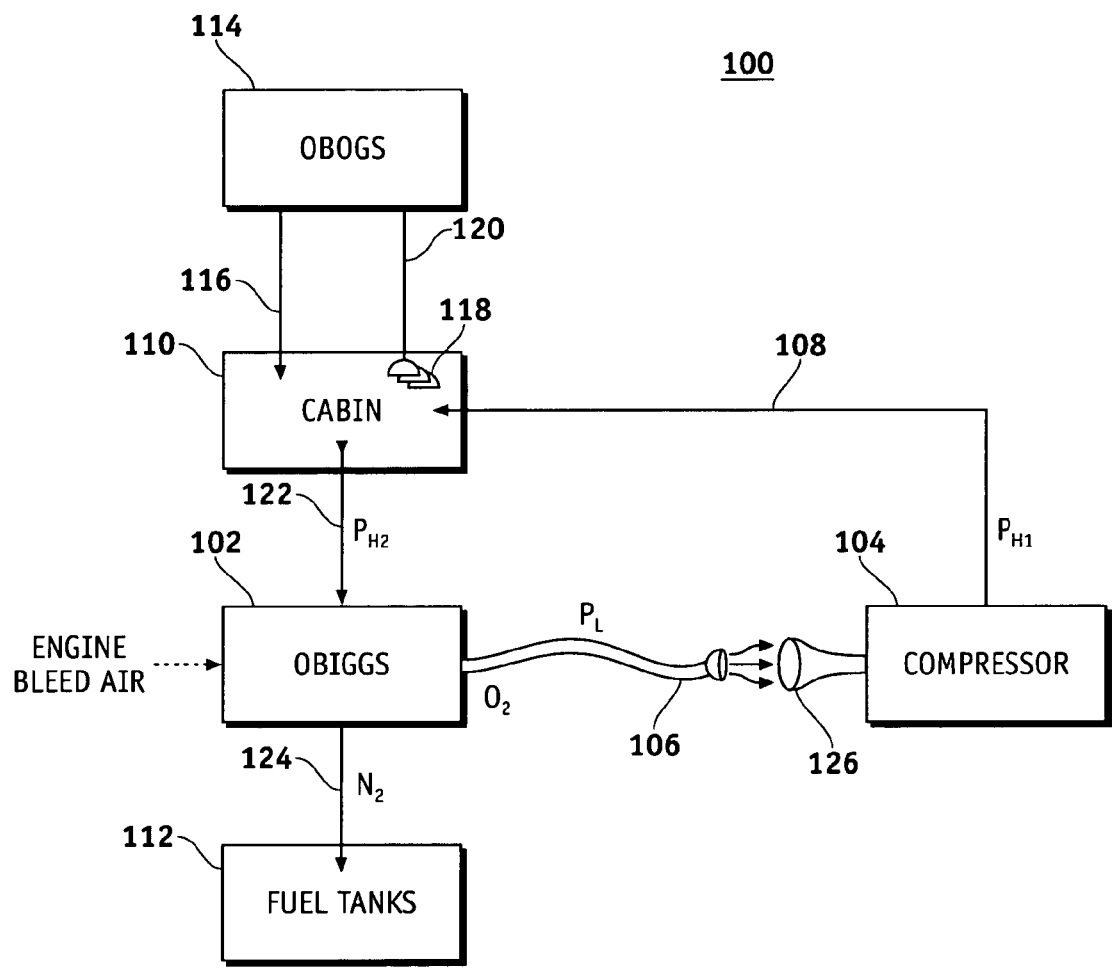
FIG. 1 is a schematic representation of a system for processing cabin air of an aircraft.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. In addition, those skilled in the art will appreciate that the present invention may be practiced in conjunction with any number of practical environments and that the aircraft cabin air processing system described herein is merely one exemplary application for the invention.

For the sake of brevity, conventional techniques and functional aspects of OBOGS, OBIGGS, aircraft cabin comfort systems, and aircraft cabin air ducting systems (and the individual operating components of such systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to components or features being "connected" or "coupled" together. As used herein, unless expressly stated otherwise, "connected" means that one component/feature is directly joined to (or directly communicates with) another component/feature, and not necessarily mechanically. Likewise, unless expressly stated otherwise, "coupled" means that one component/feature is directly or indirectly joined to (or directly or indirectly communicates with) another component/feature, and not necessarily mechanically. Thus, although the schematic shown in FIG. 1 depicts one example arrangement of elements, additional intervening elements, devices, features, or components may be present in an actual embodiment (assuming that the functionality of the system is not adversely affected).

A system configured in accordance with an example embodiment of the invention treats the air that is used for the cabin of an aircraft, e.g., a commercial airplane. The system routes oxygen enriched air, obtained from an OBIGGS, to the inlet of a cabin air compressor at ambient or recovered pressure levels. The cabin air compressor may be electric powered, turbo driven, hydraulic driven, or the like. The cabin air compressor compresses the oxygen enriched air (and some ambient air) to pressurize the cabin to normal levels for the given altitude. This results in added comfort for the passengers and crew without requiring additional drive power for the cabin air compressor and without requiring any significant modifications to the existing NGS system.

FIG. 1 is a schematic representation of a system 100 for processing cabin air of an aircraft. System 100 can be deployed as a fully onboard system having its components located on the aircraft (not shown). System 100 generally includes an OBIGGS 102, a cabin air compressor 104, suitable means for routing (identified by reference number 106) oxygen enriched air from OBIGGS 102 to cabin air compressor 104, and suitable means for delivering (identified by reference number 108) outside air to a cabin 110 of the aircraft. In the example embodiment shown in FIG. 1, OBIGGS 102 provides air enriched with an inert gas (e.g., nitrogen) to one or more fuel tanks 112 of the aircraft to reduce the flammability of fuel tanks 112. OBIGGS 102 may be realized as an NGS, and suitable NGSs are available from suppliers such as HONEYWELL, PARKER HANNIFIN, and HAMILTON SUNDSTRAND. Although not a requirement of the invention, in the example embodiment shown in FIG. 1, system 100 also includes an OBOGS 114, which is suitably configured to generate additional oxygen enriched air for the aircraft. The additional oxygen enriched air generated by OBOGS 114 may be routed into cabin 110 (as indicated by a path 116) to supplement the oxygen content in cabin 110. Moreover, the additional oxygen enriched air generated by OBOGS 114 may be routed to crew oxygen or drop-down masks 1 18 (as indicated by a path 120) for use as a supplemental source of oxygen for passengers and crew.

Cabin 110 represents a pressurized environment that is maintained at a relatively high absolute pressure as compared to the ambient environment. In a commercial airplane context, cabin 110 includes the main passenger cabin, the cockpit, and any other area of the aircraft that is pressurized for the comfort of passengers, crew, etc. As described in more detail below, cabin 110 represents an environment having a desired partial pressure of oxygen at high altitudes, where the desired partial pressure provides satisfactory comfort levels for passengers and crew. System 100 may utilize existing air conditioning, ventilation, climate control, air filtration, and possibly other subsystems, or any portion thereof, and cabin 110 may include vents, exhausts, air inlets, fans, air outlets, and other common components that may not be depicted or described herein.

This description refers to "used cabin air" and "outside air." "Used cabin air" means air that is either inside cabin 110 or air that was previously inside cabin 110 but has not yet been enriched with oxygen. In contrast, "outside air" means air that has been enriched with oxygen and pressurized to replenish cabin 110. For example, the air that serves as an input to OBIGGS 102 is used cabin air and the air generated by cabin air compressor 104 is outside air.

OBIGGS 102 obtains used cabin air from cabin 110 via one or more suitable ducts, conduits, hoses, pipes, tubes, or the like (indicated by a path 122). Alternatively, or additionally, OBIGGS 102 may obtain engine bleed air as depicted by the dashed line input. As indicated in FIG. 1, OBIGGS 102 obtains the used cabin air at a relatively high absolute pressure ($P_{H2}$) that roughly corresponds to the cabin pressure maintained by system 100. In practical deployments, $P_{H2}$ is approximately 10-15 psia. OBIGGS 102 relies on this pressure being relatively higher than ambient pressure ($P_L$) of approximately 2-5 psia for efficient operation. In one example embodiment, OBIGGS 102 is suitably configured to selectively draw oxygen, carbon dioxide, and water through a hollow fiber membrane, while allowing nitrogen enriched air to pass as an output gas. The nitrogen enriched air may be further processed or treated and routed to fuel tanks 112 using an appropriate system of ducts, conduits, hoses, pipes, tubes, or the like (indicated by a path 124).

As mentioned above, OBIGGS 102 is configured to generate, as a byproduct, oxygen enriched air from the used cabin air. The oxygen enriched air results from the "removal" of nitrogen from the used cabin air. In practice, the oxygen enriched air may contain up to 40% oxygen, where ambient air contains approximately 21% oxygen. System 100 takes advantage of this byproduct of OBIGGS 102 and routes the oxygen enriched air to an appropriate location for reuse. In the illustrated embodiment, system 100 utilizes one or more ducts, conduits, hoses, pipes, tubes, or other means 106 to route the oxygen enriched air to a location proximate an intake 126 of cabin air compressor 104, where the oxygen enriched air is released for delivery to cabin air compressor 104. In practice, intake 126 is placed in an unpressurized location of the aircraft (relative to cabin 110). For example, intake 126 may be placed in a location that is exposed to ambient pressure conditions. Thus, at normal flying altitudes the oxygen enriched air is provided to intake 126 at a relatively low absolute pressure ($P_L$) relative to $P_{H2}$ (ambient pressure $P_L$ is approximately 2-5 psia). This configuration is desirable to enable OBIGGS 102 to operate in an environment having an input-to-output pressure differential. Consequently, existing OBIGGS technology need not be significantly modified for use in system 100.

In an alternate embodiment (not shown), system 100 may provide a direct path for the oxygen enriched air between OBIGGS 102 and cabin air compressor 104. For example, the means for routing 106 may be connected to cabin air compressor 104, thus eliminating the need for intake 126. In such an alternate embodiment, an intake section of cabin air compressor 104 may be vented or otherwise maintained at $P_L$ to facilitate efficient operation of OBIGGS 102.

Cabin air compressor 104 is suitably configured to compress its intake air, which contains at least the oxygen enriched air from OBIGGS 102, to generate outside air flow. Cabin air compressor 104 receives the oxygen enriched air at a relatively low absolute pressure ($P_L$) and generates the outside air at a relatively high absolute pressure ($P_{H1}$) suitable for pressurization of cabin 110. In the illustrated embodiment, cabin air compressor 104 compresses a mixture that includes the oxygen enriched air and some ambient air, where the ambient air is at the low $P_L$ pressure. Cabin air compressor 104 may employ any suitable technology to provide the desired amount of air compression and outside air flow. In practical embodiments, $P_{H1}$ is slightly higher than $P_{H2}$ (generally 1-3 psia higher), which forces the air through the ducts, nozzles, etc.

In a practical deployment, cabin air compressor 104 may be part of the existing aircraft air conditioning system. Cabin air compressor 104 may be electric powered, turbo powered, hydraulic powered, or otherwise powered by an onboard subsystem. Unlike conventional aircraft that utilize the engines as an air compressor, cabin air compressor 104 is preferably realized as a separate component that is placed in a suitable location that prevents the compressed oxygen enriched air from being overly diluted with ambient air. For example, cabin air compressor 104 can be placed within an unpressurized compartment of the aircraft.

System 100 delivers the pressurized outside air to cabin 110 for replenishment of the cabin air. In the illustrated embodiment, system 100 utilizes one or more ducts, conduits, hoses, pipes, tubes, or other means 108 to route or deliver the outside air to cabin 110. In this manner, cabin air compressor 104 functions to pressurize cabin 110 at the relatively high absolute pressure $P_{H1}$, using the outside air as the pressurization gas. In practice, system 100 forms a processing loop for the cabin air, where the loop includes OBIGGS 102 for purposes of increasing the oxygen content of the outside air.

Figure 2:
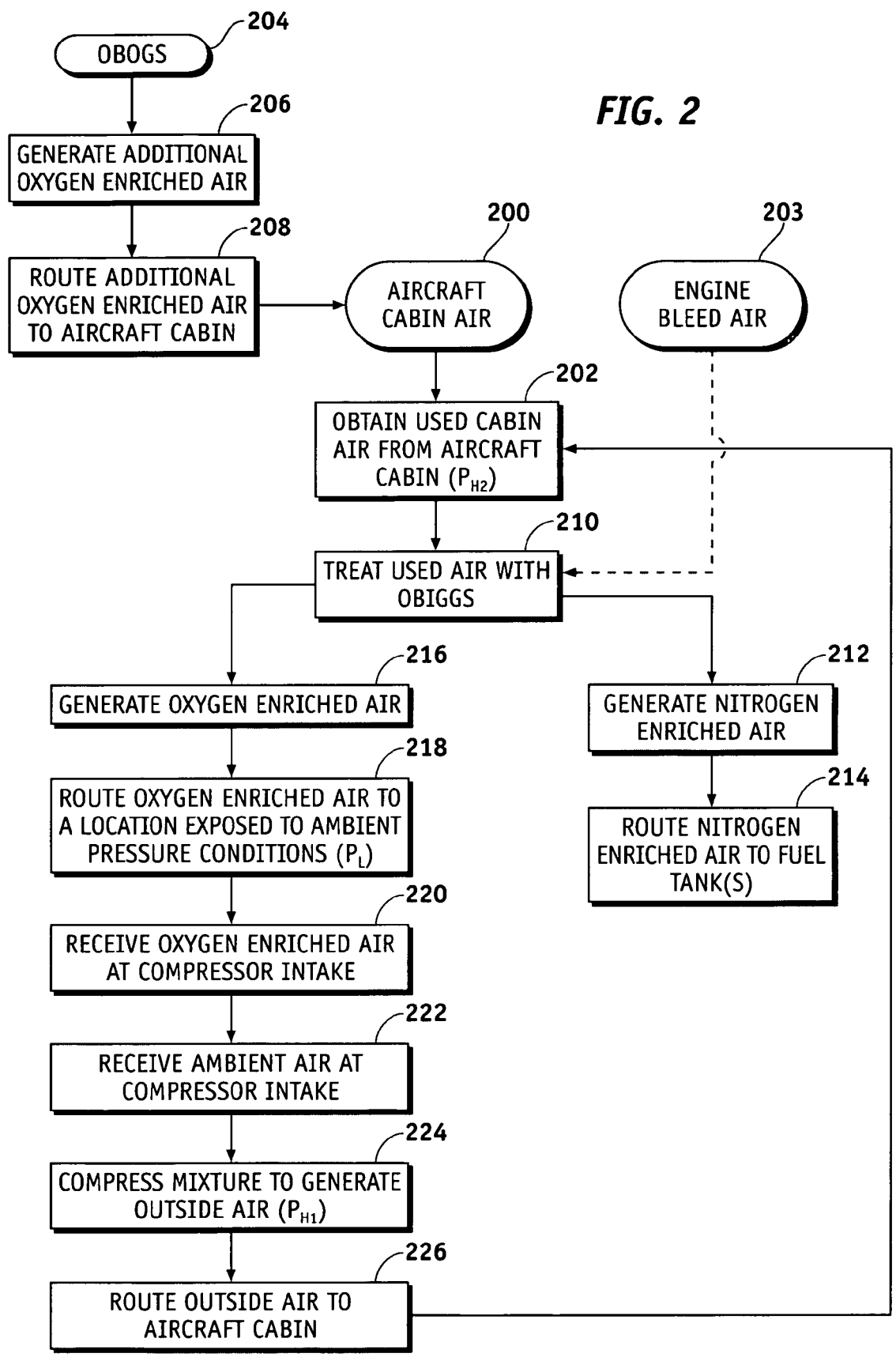
FIG. 2 is a flow chart depiction of a method for processing cabin air of an aircraft.

FIG. 2 is a flow chart depiction of a method 200 for processing cabin air of an aircraft. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of the described system, e.g., OBIGGS 102, cabin air compressor 104, or the like. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein.

Process 200 may begin by obtaining used cabin air (task 202) from the aircraft cabin at a relatively high absolute pressure ($P_{H2}$). Although not a requirement of the invention, in the example embodiment described herein, the cabin air may be supplemented with oxygen enriched air generated by an OBOGS. In this regard, an OBOGS procedure 204 is illustrated in FIG. 2. OBOGS procedure 204 generates additional oxygen enriched air (task 206) and routes the additional oxygen enriched air to the cabin (task 208). As a result, the cabin air may contain oxygen enriched air from two sources: an OBOGS and an OBIGGS.

In the example embodiment, task 202 obtains the used cabin air at an input of an OBIGGS (described above), which treats the used cabin air in a suitable manner (task 210). Alternatively, or additionally, the OBIGGS may obtain engine bleed air 203 from one or more engines of the aircraft. The primary function of the OBIGGS is the generation of nitrogen enriched air (task 212). The nitrogen enriched air may be routed to one or more fuel tanks of the aircraft for purposes of inerting the fuel tanks (task 214). The OBIGGS generates oxygen enriched air (task 216) as a byproduct, and the oxygen enriched air is routed (task 218) to a location that is exposed to ambient pressure conditions. In the example embodiment, task 218 provides the oxygen enriched air to an intake of a cabin air compressor, and the intake is maintained at a relatively low absolute pressure ($P_L$) corresponding to ambient pressure.

The intake of the cabin air compressor receives the oxygen enriched air (task 220) generated by the OBIGGS. In this example, the intake of the cabin air compressor also receives an amount of ambient air (task 222). The cabin air compressor compresses a mixture of the oxygen enriched air and the ambient air to generate outside air at a relatively high absolute pressure, $P_{H1}$ (task 224). Thus, the outside air includes at least some of the oxygen enriched air produced by the OBIGGS. The pressurized outside air can then be routed into the aircraft cabin (task 226) to replenish the cabin air supply. In practical embodiments, the cabin air compressor supplies the outside air in a quantity and at a pressure that allows the cabin to be maintained at the desired comfort level. Notably, the cabin air compressor functions to maintain the cabin at the desired pressurization level, e.g., $P_{H2}$. As depicted in FIG. 2, process 200 can be re-entered at task 202 such that the cabin air is continuously refreshed with oxygen enriched air from the OBOGS and the OBIGGS.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for processing cabin air of an aircraft having a cabin, said method comprising:
   obtaining used cabin air at a relatively high absolute pressure at an input of an onboard inert gas generation system ("OBIGGS")
   generating, with said OBIGGS, oxygen enriched air;
   providing, at a relatively low absolute pressure, said oxygen enriched air to an intake of a cabin air compressor;
   and generating, with said cabin air compressor, outside air at a relatively high absolute pressure, said outside air including said oxygen enriched air.

2. A method according to claim 1, wherein:
   said used cabin air is obtained from the cabin of the aircraft; and
   said method further comprises routing said outside air into the cabin.

3. A method according to claim 1, wherein providing said oxygen enriched air comprises routing said oxygen enriched air to a location proximate said intake, said location being exposed to ambient pressure conditions.

4. A method according to claim 1, further comprising:
   generating, with said OBIGGS, nitrogen enriched air; and
   routing said nitrogen enriched air to a fuel tank of the aircraft.

5. A method according to claim 1, further comprising:
   generating additional oxygen enriched air with an onboard oxygen generation system ("OBOGS"); and
   routing said additional oxygen enriched air into the cabin.

6. A method according to claim 1, wherein generating outside air comprises:
   receiving said oxygen enriched air at said intake;
   receiving ambient air at said intake; and
   compressing, with said cabin air compressor, a mixture of said oxygen enriched air and said ambient air.

7. A method for processing cabin air of an aircraft having a cabin, said method comprising:
   treating used cabin air with an onboard inert gas generation system ("OBIGGS") to generate oxygen enriched air;
   routing said oxygen enriched air to a cabin air compressor; and
   compressing, with said cabin air compressor, at least said oxygen enriched air to generate outside air.

8. A method according to claim 7, further comprising:
   said OBIGGS obtaining said used cabin air at a relatively high absolute pressure;

said cabin air compressor receiving said oxygen enriched air at a relatively low absolute pressure; and said cabin air compressor generating said outside air at a relatively high absolute pressure.

9. A method according to claim 7, further comprising routing said outside air into the cabin.

10. A method according to claim 7, wherein routing said oxygen enriched air comprises delivering said oxygen enriched air to a location proximate an intake of said cabin air compressor, said location being exposed to ambient pressure conditions.

11. A method according to claim 10, further comprising:
receiving said oxygen enriched air at said intake;
receiving ambient air at said intake; and
compressing, with said cabin air compressor, a mixture of said oxygen enriched air and said ambient air.

12. A method according to claim 7, further comprising:
generating, with said OBIGGS, nitrogen enriched air; and
routing said nitrogen enriched air to a fuel tank of the aircraft.

13. A method according to claim 7, further comprising:
generating additional oxygen enriched air with an onboard oxygen generation system ("OBOGS"); and
routing said additional oxygen enriched air into the cabin.

14. A system for processing cabin air of an aircraft having a cabin, said system comprising:
an onboard inert gas generation system ("OBIGGS") configured to generate oxygen enriched air from used cabin air;

a cabin air compressor configured to compress at least said oxygen enriched air to generate outside air;
means for routing said oxygen enriched air to said cabin air compressor; and
means for delivering said outside air to the cabin.

15. A system according to claim 14, wherein:
said OBIGGS obtains said used cabin air at a relatively high absolute pressure;
said cabin air compressor receives said oxygen enriched air at a relatively low absolute pressure; and
said cabin air compressor is configured to generate said outside air at a relatively high absolute pressure.

16. A system according to claim 14, wherein:
said cabin air compressor comprises an intake; and
said means for routing delivers said oxygen enriched air to a location proximate said intake, said location being exposed to ambient pressure conditions.

17. A system according to claim 14, said cabin air compressor being configured to compress a mixture of said oxygen enriched air and ambient air to generate said outside air.

18. A system according to claim 14, further comprising a fuel tank for the aircraft, wherein said OBIGGS is configured to generate nitrogen enriched air for said fuel tank.

19. A system according to claim 14, further comprising an onboard oxygen generation system ("OBOGS") configured to generate additional oxygen enriched air for the cabin.

20. The method of claim 1, wherein said OBIGGS comprises a membrane for generating said oxygen enriched air.

* * * * *